Feb. 25, 1969   H. FEUERSTAKE   3,429,715
METHOD AND APPARATUS FOR TREATING BUTTER
Filed Feb. 21, 1966
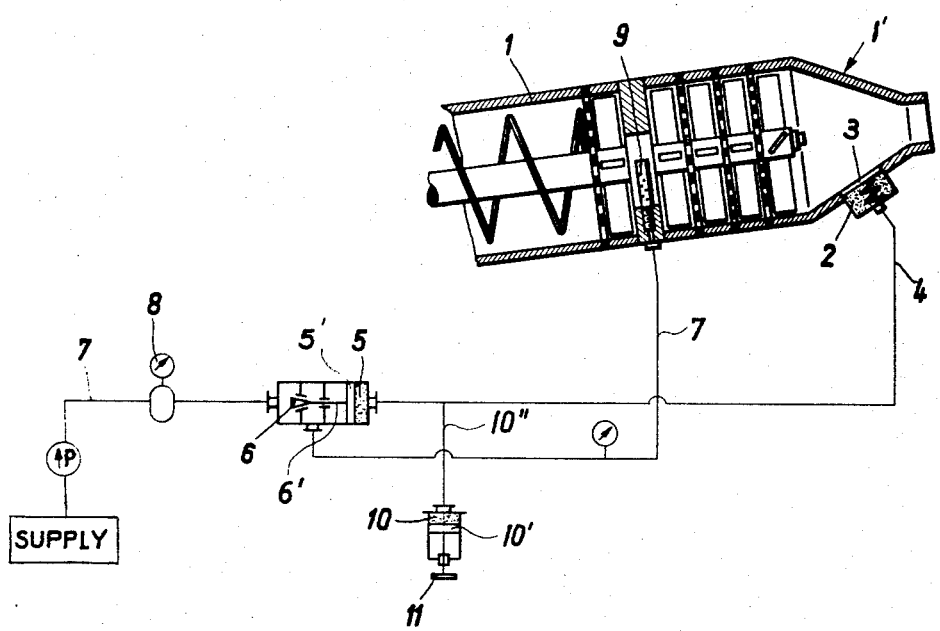
Inventor:
HEINRICH FEUERSTAKE
BY Michael J. Striker
his ATTORNEY 3,429,715
METHOD AND APPARATUS FOR
TREATING BUTTER
Heinrich Feuerstake, Dortmund-Miederhofen, Germany, assignor to Holstein & Kappert Maschinenfabrik "Phönix" G.m.b.H., Dortmund, Germany
Filed Feb. 21, 1966, Ser. No. 529,138
Claims priority, application Germany, Feb. 23, 1965, H 55,259
U.S. Cl. 99—119          11 Claims
Int. Cl. A23c 15/10; A01j 17/00, 21/02

The present invention relates to an apparatus for treating butter. More specifically, the invention relates to an apparatus for controlling the admixture of additive to butter which is being treated in a butter-making apparatus. Still more specifically, the invention relates to an apparatus of the type mentioned above which permits the exact regulation of the dosages of such additives in a continuously operating butter-making apparatus. The invention also relates to a method of treating butter.

The quantities of additives which may be added to butter for purposes of flavoring, coloring and the like are rigidly controlled by various laws and ordinances. For this reason, and also because a relatively small over- or under-dosage of such additives can spoil the appearance and/or flavor of butter, it is essential that hte quantities of such additives which are admixed with the butter be precisely controlled.

Various ways of adding controlled quantities of additives to butter are known. None of them is satisfactory, however. This includes devices which are time-dependent in the sense that they add certain quantities of additives to the butter over a predetermined period of time. The reason for the unsatisfactory performance of such devices is based various facts, one of these being that the butterfat content of the cream from which butter is made often differs greatly from batch to batch. In other words, if the cream is rich an input of a given number of gallons of cream into the butter-making apparatus will produce more butter than if the cream is lean. Thus, the time-factor is unreliable since rich cream will produce a greater quantity of butter in the same period of time than lean cream. Accordingly, the addition of additives to the butter on a time-dependent basis results in considerable variation in the quantity of additive contained in the finished butter product.

It is therefore a general object of the present invention to provide a method and apparatus which will overcome the drawbacks known from the prior art.

A more specific object of the present invention is to provide an apparatus which will add predetermined and precisely controlled quantities of additive to the butter in a butter-making apparatus.

A further object of the invention is to provide an apparatus of the type outlined above in which the additive admixture is not time-dependent.

A concomitant object of the invention is to provide a method of treating butter which overcomes the disadvantages outlined with respect to the prior art.

In accordance with one feature of the invention I provide such a method of treating butter which comprises the steps of conveying a mass of butter at a variable rate along a predetermined path and at a pressure which varies as a function of variations in said rate. The pressure of the butter in said path is measured, and thereafter an additive is admitted to the mass of butter and the admission of such additive is regulated as a function of variations in the pressure of the butter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which: the single figure is a schematic representation of an apparatus in accordance with the present invention.

Discussing now the figure in detail, it will be seen that there is shown an enclosed screw-type conveyor 1 having an outlet portion 1'. Arranged at the outlet portion 1' is a hydraulic sensing or pressure measuring device 2 in the form of a liquid-filled capsule 3 in which a coil spring bears against a diaphragm 3 which is arranged in the wall of the outlet portion 1 and communicates with the interior of the latter.

The pressure measuring device 2 is connected via a liquid-filled conduit 4 with a further pressure measuring device 5 which may be of a construction similar to that of the device 2, and which is so arranged that its diaphragm 5' carries or is operatively connected with a valve stem 6' which in turn carries a valve member 6 adapted to seat against a valve seat in a suitable distributor. The additive is obtained from a suitable supply and is fed to the distributor by means of any well known pump through a conduit 7, which is connected with the distributor in such a way that the additive must flow past the valve member 6. A flow meter 8 is arranged in the conduit 7 to permit control and observation of the quantity of additive passing through the conduit 7. It should be noted here that the additive may be of any of the types which are mentioned at the beginning of this specification, for example brine used in the production of "salted" butter.

In the distributor the additive flows past the valve member 6 and then returns downstream of the distributor into the conduit 7, from where it flows to the conveyor 1 to be added to the mass of butter passing therethrough by the injector 9.

In operation of the novel device, the butter will pass through the conveyor 1 in direction towards the outlet portion 1', namely to the right in the figure. The pressure measuring device 2 is adjusted for a predetermined level of pressure, for instance by the biasing force exerted on its diaphragm by the coil spring, and if the pressure of the butter in the outlet portion 1' rises above or falls below this predetermined level of pressure, the diaphragm 3 of the pressure measuring device 2 flexes inwardly or outwardly in response to such variation in pressure. Such responses effect the pressure in the fluid-filled conduit 4 and are conveyed therethrough to the pressure responsive device 5 where they vary the pressure of the fluid contained in the latter, thereby causing flexing of the diaphragm 5'. Such flexing of the diaphragm 5', in turn, causes the valve member 6 to be moved closer to or farther away from its seat, thus varying the valve cross-section and controlling the rate at which the additive can flow from the supply through the conduit 7 into the distributor, and from there to the injector 9. Thus, the admission of additive to the mass of butter is regulated as a function of variations in the pressure of the butter as measured in the outlet portion 1' of the conveyor 1.

In accordance with a further feature of the invention a third pressure regulating device 10, which may be similar to the device 5, may be connected with the fluid-filled conduit 4 by means of a secondary fluid-filled conduit 10", and the pressure of fluid in the pressure regulating device 10 may be varied by means, for instance, of an adjusting knob or wheel 11 having a stem which, when the knob or wheel 11 is rotated, will exert greater or lesser pressure on the diaphragm 10' of the pressure measuring device 10, flexing this diaphragm 10'. Since the conduit 10" is also fluid-filled such flexing of the diaphragm 10' will in turn cause a variation in pressure in the conduit 10" which is transmitted to the conduit 4 so that the preselected standard pressure, which serves as the basis of measurement can thereby be varied at will. Thus, the operation of the pressure regulating device 10 permits the selection of a predetermined minimum flow of additive from the supply through the conduit 7 to the injector 9.

Of course, various modifications are possible and will offer themselves readily to those skilled in the art. For example it is possible to arrange in the conduits, for instance in the conduit 4, a pressure amplifier for increasing the sensitivity and accuracy of the novel device. Also, the sensing device need not be arranged at the outlet portion 1' or, indeed, even downstream of the injector 9. It should be understood that, with the invention as described by way of example, pressure variations are measured and compensated for on a long-range basis. If it is desired to obtain measurement and compensation for short-range fluctuations, then the sensing device may be arranged immediately downstream of the injector 9, or even upstream thereof.

Finally, the devices 2, 5 and 10 may also be of different construction than that shown, for example with a piston substituted for the diaphragm in any or all of them.

The device and method described herein make it possible to govern the addition of additive to a traveling mass of butter to a degree and with an accuracy which is not known in the prior art.

It will be understood that each of the elements described above, or two or more together, may also find a useful application in other types of butter-processing differing from the types described above.

While the invention has been illustrated and described as embodied in a butter-processing apparatus and method, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be secured by Letters Patent is:

1. In a method of treating butter, the steps of conveying a mass of butter at a variable rate of feed along a predetermined path and at a pressure which varies as a function of variations in said rate of feed; measuring said pressure; admitting to said mass of butter an additive; and regulating the admission of such additive as a function of variations in said pressure.

2. A method as set forth in claim 1, wherein said additive is admitted at a preselected pressure and upstream of the location at which said pressure is measured.

3. A method as set forth in claim 2, comprising the additional step of comparing the pressure of the additive with the pressure of the butter and adjusting the pressure of the additive in response to changes in the pressure of the butter.

4. In a butter-processing apparatus, feed means for feeding a mass of butter along a predetermined path at a variable rate and at a pressure which varies as a function of variations in said rate; admitting means for admitting a variable quantity of an additive to said mass of butter; sensing means for sensing variations of pressure in said mass of butter which occur in a predetermined zone of said path; and regulating means operatively connected with said sensing means and said admitting means for regulating the rate of admission of said additive as a function of variations in said pressure.

5. An apparatus as set forth in claim 4, wherein said sensing means is a pressure capsule comprising a first fluid-containing cavity and pressure-responsive diaphragm arranged at a given point along said path and closing said cavity.

6. An apparatus as set forth in claim 5, wherein said regulating means comprises an additional fluid-containing pressure capsule similar to said first fluid-containing pressure capsule; and further comprising fluid-filled conduit means connecting and communicating with both said cavities.

7. An apparatus as set forth in claim 6, wherein said admitting means is a valve comprising a valve seat, a valve member adapted to sealingly engage said valve seat, and a valve stem carrying said valve member; and wherein the diaphragm of said further pressure capsule is operatively connected with said valve stem, whereby pressure variations sensed by said sensing means and transmitted through said fluid-filled conduit means in a sense causing movement of said diaphragm of the further pressure capsule, cause said valve member to be displaced toward and away from said valve seat.

8. An apparatus as set forth in claim 6, wherein said admitting means is a valve comprising a valve seat, a valve member adapted to sealingly engage said valve seat, and a valve stem carrying said valve member; and wherein the diaphragm of said further pressure capsule is operatively connected with said valve stem, whereby pressure variations sensed by said sensing means and transmitted through said fluid-filled conduit means in a sense causing movement of said diaphragm of the further pressure capsule, cause said valve member to be displaced toward and away from said valve seat; and adjusting means for selectively imparting pressure to the fluid in said fluid-filled conduit means.

9. An apparatus as set forth in claim 8, wherein said adjusting means ocmprises a further pressure capsule similar to the first mentioned capsules and operatively connected with the interior of said fluid-filled conduit means, said further pressure capsule having means for selectively varying the pressure on the fluid in the fluid-containing cavity thereof, whereby to cause movement of the associated diaphragm.

10. An apparatus as st forth in claim 4, wherein said admitting means comprises tubing means leading from said feed means to said predetermined path; and further comprising flow metering means connected with said tubing means for measuring the flow of additive therethrough.

11. An apparatus as set forth in claim 4, and further comprising pressure amplifying means connected intermediate said sensing means and said amplifying means for amplifying pressure variation sensed by said sensing means and forwarded to said regulating means.

References Cited
UNITED STATES PATENTS

| | | | |
|---|---|---|---|
| 2,649,377 | 8/1953 | Wilsmann | 99—119 |
| 3,134,170 | 5/1964 | Wilsmann et al. | 31—33 |
| 3,233,327 | 2/1966 | Martensson et al. | 31—89 |
| 3,268,341 | 8/1966 | Sjoholm et al. | 99—119 |
| 3,324,551 | 6/1967 | Mnilk et al. | 31—89 |
| 3,353,270 | 11/1967 | Simon | 31—33 |

ALDRICH F. MEDBERY, *Primary Examiner.*

U.S. Cl. X.R.

31—35, 89; 99—244